United States Patent [19]

Mori et al.

[11] Patent Number: 4,463,917
[45] Date of Patent: Aug. 7, 1984

[54] WEBBING RETRACTOR

[75] Inventors: Shinji Mori; Akinori Fujiwara; Takashi Kawaharazaki, all of Aichi, Japan

[73] Assignee: Kabushiki Kaisha Tokai-Rika-Denki-Seisakusho, Aichi, Japan

[21] Appl. No.: 402,583

[22] Filed: Jul. 28, 1982

[30] Foreign Application Priority Data

Aug. 12, 1981 [JP] Japan .................. 56-119452[U]
Sep. 14, 1981 [JP] Japan .................. 56-136645[U]

[51] Int. Cl.³ .................. A62B 35/02; B65H 75/48
[52] U.S. Cl. .................. 242/107.4 A; 242/107.4 B
[58] Field of Search .......... 242/107.4 R, 107.4 A, 242/107.4 B; 280/806; 297/478, 480

[56] References Cited

U.S. PATENT DOCUMENTS

| | | | |
|---|---|---|---|
| 4,044,969 | 8/1977 | Wallin | 242/107.4 B X |
| 4,099,685 | 7/1978 | Paitula | 242/107.4 B |
| 4,101,092 | 7/1978 | Schmelow et al. | 242/107.4 B |
| 4,228,970 | 10/1980 | Morinaga | 242/107.4 B X |
| 4,262,858 | 4/1981 | Takada | 242/107.4 A |
| 4,277,036 | 7/1981 | Seifert et al. | 242/107.4 B X |

Primary Examiner—Stuart S. Levy
Assistant Examiner—Joseph J. Hail, III
Attorney, Agent, or Firm—Koda and Androlia

[57] ABSTRACT

A lock ring journalled on a takeup shaft for winding an occupant restraining webbing is adapted to guide a plurality of lock plates provided around the takeup shaft in directions opposite to each other, and an engageable device subjected to a turning force of the takeup shaft in an emergency situation of a vehicle drives the lock plates in directions opposite to each other due to a lag in rotation of the lock ring from the takeup shaft and pushes the lock plates against an internally toothed ratchet wheel to thereby stop the takeup shaft from rotating in the webbing unwinding direction.

11 Claims, 12 Drawing Figures

WEBBING RETRACTOR

BACKGROUND OF THE INVENTION

1. Field of the Invention

This invention relates to a webbing retractor used in a seatbelt system for protecting an occupant in an emergency situation of a vehicle, for winding a webbing for restraining the occupant.

2. Description of the Prior Art

A webbing retractor used in a seatbelt system is adapted to wind an end portion of a webbing for restraining an occupant by its biasing force and to instantaneously stop the unwinding of the webbing by its locking device in an emergency situation of a vehicle.

This locking device, being required to reliably support an inertial force of the occupant to be violently moved in a direction of collision in an emergency situation of a vehicle, must have a mechanical strength of a high value. From this reason, heretofore, there has been widely used such locking means in which a ratchet wheel is solidly secured to a takeup shaft, and a lock bar journalled on a frame is meshed with this ratchet wheel.

The meshing means of the lock bar and the ratchet wheel solidly secured to this takeup shaft makes it possible to reliably lock the takeup shaft, however, presents a disadvantage of increasing the outer diameter of the webbing retractor.

Additionally, in a locking mechanism not using the combination of the lock bar and the ratchet wheel solidly secured to the takeup shaft, an unbalanced rotation may be generated with the lock member rotating along with the takeup shaft and loosenesses may occur between the lock member and the takeup shaft, thereby causing an instable acceleration of response.

SUMMARY OF THE INVENTION

The present invention has been developed to obviate the above-described disadvantages of the prior art and has as its object the provision of a webbing retractor being compact in size, having a mechanical strength of a high value at the time of locking and being stable in acceleration of response.

The webbing retractor according to the present invention is of such an arrangement that a lock ring guides a pair of lock plates provided around the takeup shaft in such a manner that the lock plates are movable in directions opposite to each other, and engageable means for receiving a turning force of the takeup shaft in an emergency situation of a vehicle drives the lock plates in the directions opposite to each other due to a lag in rotation of the lock ring and urges the lock plates onto the internally toothed ratchet wheel so as to stop the webbing unwinding rotation of the takeup shaft.

Description will hereunder be given of embodiments of the present invention with reference to the drawings.

DESCRIPTION OF THE PREFERRED EMBODIMENTS

Figure 1:
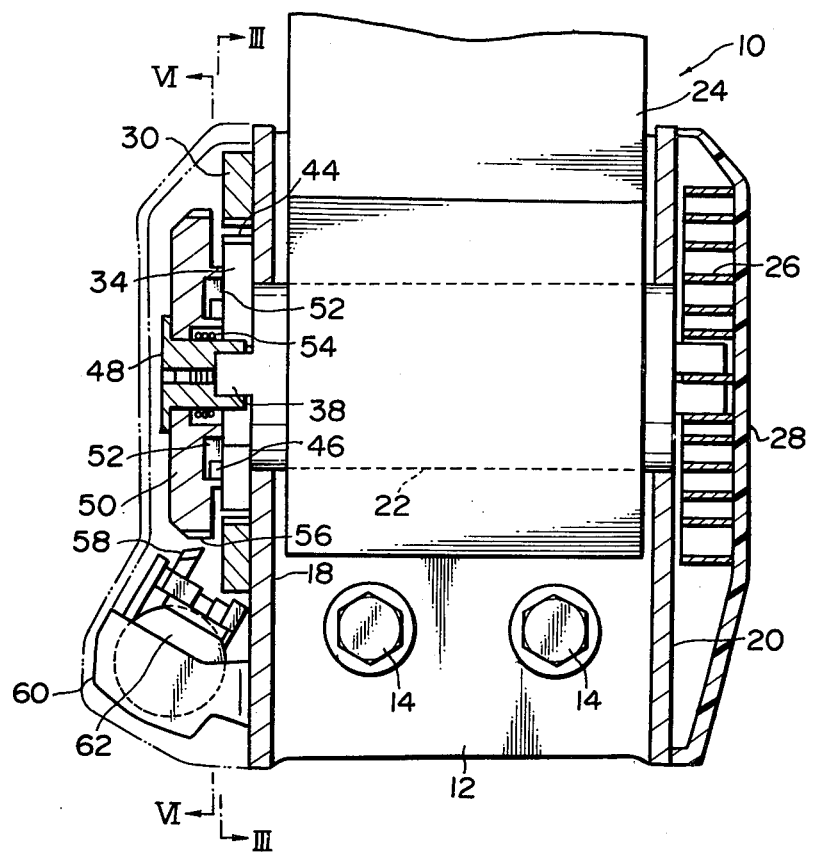
FIG. 1 is a sectional view showing a first embodiment of the webbing retractor according to the present invention.
Figure 2:
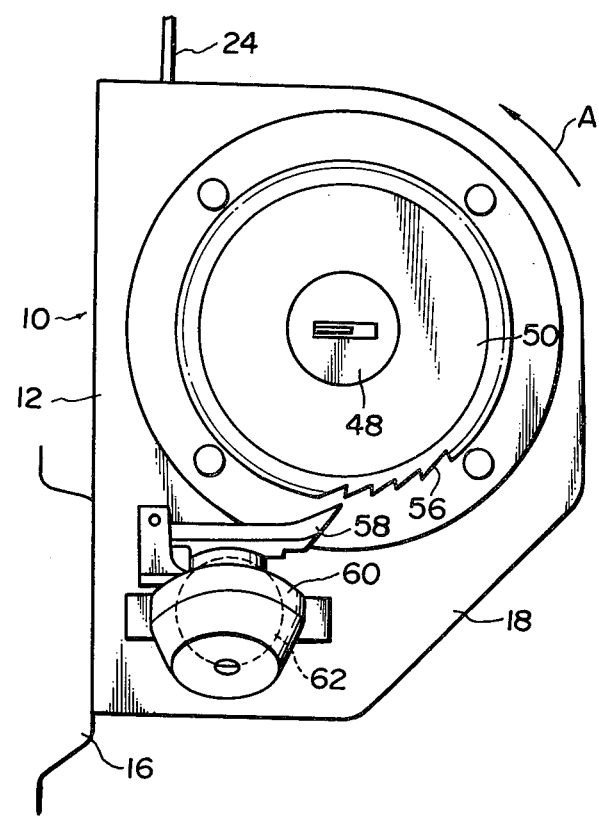
FIG. 2 is a left side view of FIG. 1.
Figure 3:
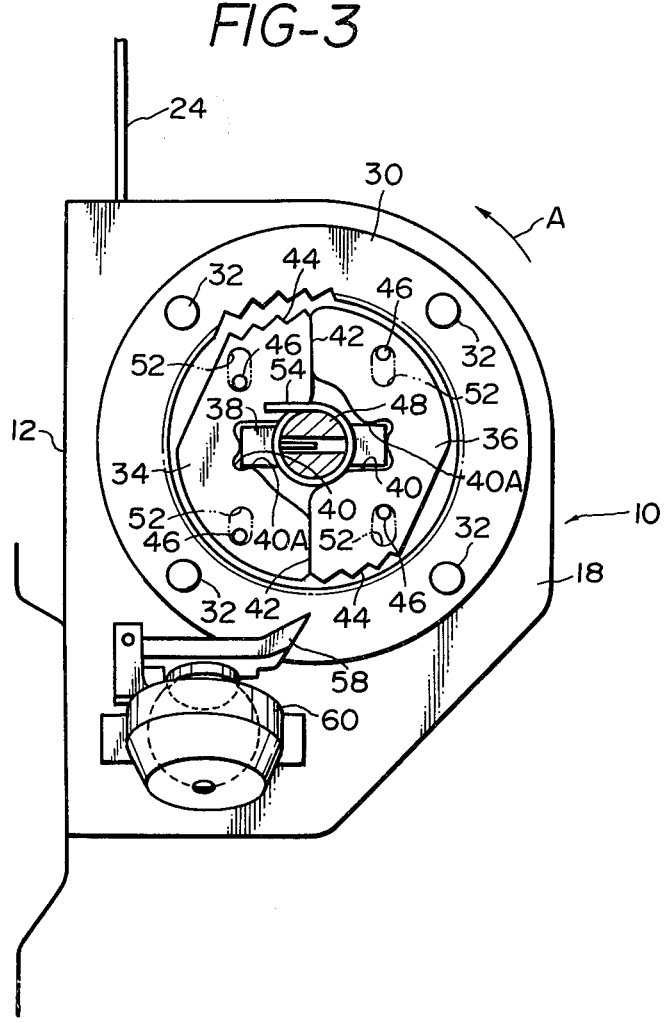
FIG. 3 is a sectional view taken along the line III—III in FIG. 1.
Figure 4:
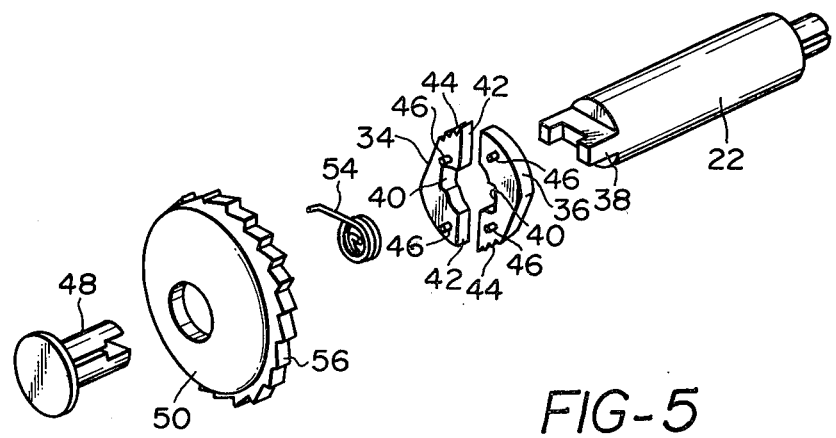
FIG. 4 is a disassembled perspective view showing the locking mechanism portion.

As shown in FIGS. 1 through 3, a webbing retractor 10 in the present embodiment is solidly secured at its frame 12 to a vehicle body 16 through mounting bolts 14. A takeup shaft 22 is pivotally supported by legs 18 and 20 extending from opposite side portions of this frame 12 in parallel to each other. One end portion of a webbing 24 for restraining an occupant is wound in layers by the central portion of this takeup shaft 22. Furthermore, an end portion of the takeup shaft 22, which has passed through the leg 20, is secured thereto with an inner end of a spiral spring 26, an outer end of which is engaged with a spring case 28 solidly secured to the leg 20. In consequence, the takeup shaft 22 is biased in a direction of winding the webbing 24 (in a direction indicated by an arrow A in FIGS. 2 and 3). Solidly secured to the outer surface of the leg 18 through four rivets 32 is an internally toothed ratchet wheel 30. A pair of lock plates 34 and 36 functioning as lock members are opposed to each other in this rachet wheel 30.

These lock plates 34 and 36 are formed at the central portions thereof with recesses 40, respectively, for receiving rectangular projections 38 which are protrusions of the takeup shaft 22 in the radial directions thereof, whereby each of the lock plates 34 and 36 generally constitutes a substantial C-shape. Additionally, opposite end portions of these C-shapes, i.e., end faces 42 of the lock plates 34 and 36 surrounding the takeup shaft 22 are disposed on a straight line incorporating therein the axis of the takeup shaft 22 and constitute surfaces of abutting against each other.

Figure 5:
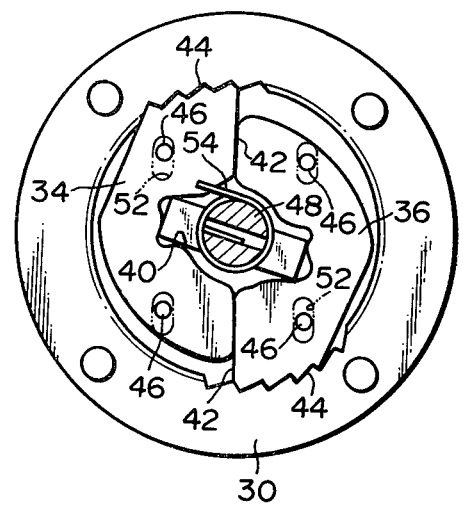
FIG. 5 is a view illustrating the locking mechanism portion in a locked position.

The end faces 42 constitute sliding surfaces movable in directions opposite to each other when the pair of lock plates are slidably moved into a locked state indicated in FIG. 5. However, gaps may be provided between the end faces 42 as the case may be.

The outer peripheries of the pair of lock plates 34 and 36 are partially formed with locking clicks 44, which are adapted to be engaged with the internally toothed ratchet wheel 30 when the lock plates 34 and 36 slide on the end faces in the directions opposite to each other, so that rotation of the lock plates 34 and 36 and the takeup shaft 22 can be prevented. In consequence, the lock plates 34, 36 and the rectangular projections 38 of the takeup shaft 22 are movable relative to each other from a state indicated in FIG. 5. Further, projected from each one side of these lock plates 34 and 36 are a pair of pins 46 in parallel to the takeup shaft 22.

Figure 6:
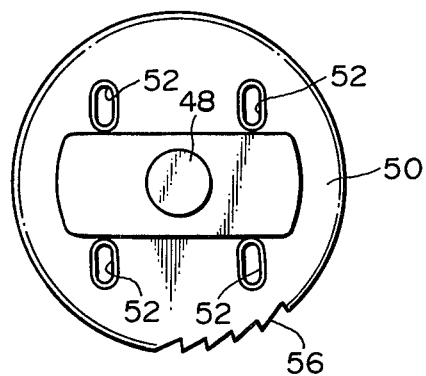
FIG. 6 is a side view in the direction indicated by the arrows from line VI—VI in FIG. 1.

A pivot 48 is disposed coaxially with the rectangular projections 38 of the takeup shaft 22 and adapted to rotate integrally with the takeup shaft 22. An inertial plate 50, as a lock ring, is pivotally supported on this pivot 38 in a manner to be rotatable relative to the pivot 48, and four slots 52 are formed on the surface of this inertial plate 50 at the side of the lock plates as shown in FIGS. 5 and 6. Pins 46 projected from the lock plates 34 and 36 are received in these slots 52, respectively, so that the pair of lock plates 34 and 36 are movable in directions opposite to each other by a value of stroke of the slots 52, while sliding on the end faces 42.

Here, the inertial plate 50 is biased in the clockwise direction about the takeup shaft 22, i.e., the unwinding direction of the takeup shaft 22 in FIG. 3 by a torsion coil spring 54 confined between the pivot 48 and itself. In consequence, when the takeup shaft 22 is rotated in the unwinding direction of the webbing at an acceleration of a predetermined value or less, the inertial plate 50, receiving a biasing force of the spring, follows the takeup shaft 22 to rotate integrally therewith. However, if the webbing unwinding rotation of the takeup shaft 22 exceeds a predetermined value, the torsion coil spring 54 is flexed to cause a lag in rotation of the inertial plate 50 from the takeup shaft 22. When this lag in rotation occurs, then the takeup shaft 22 is adapted to cause the lock plates 34 and 36 to move in directions opposite to each other as shown in FIG. 5, and at the time of this movement, the pins 46 of the lock plates 34 and 36 move in the slots 52.

In addition, under a normal condition where the takeup shaft does not make a violent rotation in the direction of unwinding, as shown in FIG. 3, the pins 46 of the lock plates abut against one end of the slots 52, and portions of the recesses 40 as being stoppers 40A abut against the takeup shaft's rectangular projections 38.

Ratchet teeth 56 are formed on the outer periphery of the inertial plate 50 and opposed to a pawl 58 journalled on the leg 18. This pawl 58 is adapted to be pushed up by an inertial ball 62 received in a case 60 of the leg 18 and engaged with the ratchet teeth 56. The pawl 58 is adapted to be separated from the ratchet teeth 56 during normal running condition of the vehicle, however, when the acceleration of the vehicle reaches a predetermined value, the inertial ball 62 moves to bring the pawl 58 into engagement with the ratchet teeth 56, whereby rotation of the inertial plate 50 in the direction of unwinding is stopped so as to cause a lag in rotation of the inertial plate 50 from the takeup shaft 22.

In the retractor 10 of the present embodiment with the above-described arrangement, the occupant can unwind the webbing 24 from the takeup shaft 22 to fasten the webbing about him. In the operation of winding or unwinding of the webbing 24 during normal use condition, no high rotational acceleration takes place with the takeup shaft 22, whereby the inertial plate 50 rotates, following the rotation of the takeup shaft 22, so that the unwinding rotation of the takeup shaft 22 can be prevented from being locked.

In an emergency situation of the vehicle such as a collision, the occupant fastened thereabout with the webbing 24 violently moves in a direction of the collision, whereby the webbing 24 is rapidly unwound from the takeup shaft 22, so that a high unwinding acceleration takes place with the takeup shaft 22.

By this, the inertial plate 50 has a lag in rotation from the takeup shaft 22, the rectangular projections 38 drive the lock plates 34 and 36 in directions opposite to each other through the recesses 40 to bring the lock plates 34 and 36 into engagement with the internally toothed ratchet wheel 30 as shown in FIG. 5. In consequence, the unwinding rotation of the takeup shaft 22 is instantaneously stopped, whereby the occupant is reliably restrained by the webbing 24, thereby enabling to secure the safety of the occupant.

During this operation, the lock plates 34 and 36 are arranged in diametrically opposite directions as centered about the axis of the takeup shaft 22, whereby no unbalanced rotation occurs and the pins 46 are moved, being guided by the slots 52 of the inertial plate 50, so that the lock plates 34 and 36 can be free from loosenesses.

Since, in the locked state, the rectangular projection 38 of the takeup shaft 22 apply a compressive force between the recesses and the locking clicks 44 to stop the unwinding rotation of the takeup shaft 22, the lock plates 34 and 36 have very high mechanical strength, so that there is little possibility that the lock plates 34 and 36 are damaged. Further, the lock plates 34 and 36 are meshed with the internally toothed ratchet wheel 30 such that the pair of lock plates are arranged symmetrically as centered about the axis of the takeup shaft 22, whereby the lock plates 34 and 36 are engaged with the wheel 30 at two positions, so that the locked state can be stabilized.

Since the above-described locked state can be achieved by the engagement between the lock plates 34, 36 and the internally toothed ratchet wheel 30, the retractor 10 is rendered very compact in size.

The acceleration of the vehicle generated in an emergency situation of the vehicle moves the inertial ball 62, whereby the pawl 58 is brought into engagement with one of the ratchet teeth 56 to stop the unwinding rotation of the inertial plate 50. Also, this leads to a relative rotation between the inertial plate 50 and the takeup shaft 22, so that the occupant can be brought into a state being restrained by the webbing 24 before he is thrown out in the direction of collision or even when he is not thrown out.

Upon ending of the emergency situation of the vehicle, the lock plates 34 and 36 are separated again by some winding of the webbing 24 from the internally toothed ratchet wheel 30 to be brought into a state shown in FIGS. 1 and 3, thereby enabling to be used as a normal retractor.

Figure 7:
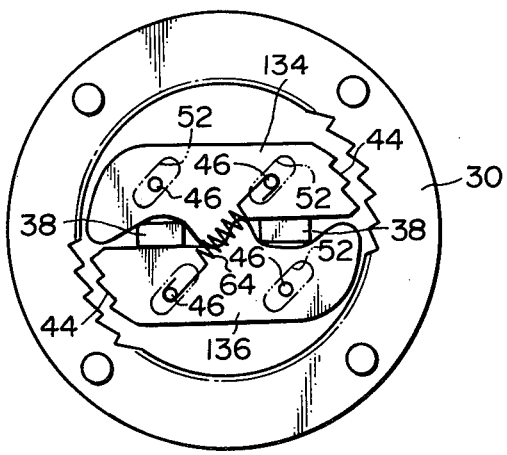
FIG. 7 is a side view corresponding to FIG. 3, showing a second embodiment of the present invention.
Figure 8:
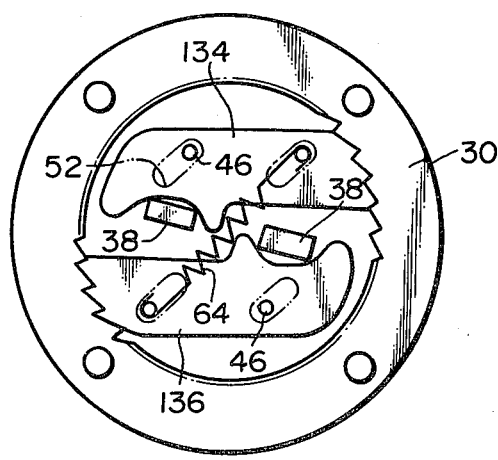
FIG. 8 is a view showing the actuated position of FIG. 7.
Figure 9:
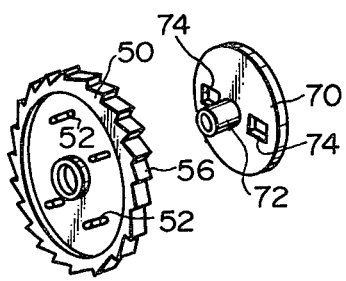
FIG. 9 is a perspective view showing the inertial plate used in the second embodiment.

FIGS. 7 through 9 show the second embodiment of the present invention, in which is illustrated another embodiment of the lock plates.

In this embodiment, as being different from the preceding embodiment, lock plates 134 and 136 are adapted to move in the radial directions of the takeup shaft 22, whereby the locking clicks 44 are brought into engagement with the internally toothed ratchet wheel 30. Furthermore, a tension coil spring 64 is wound round the pins 46, respectively, between the lock plates 134 and 136, whereby the lock plates are biased to approach each other, so that the same function as the torsion coil spring 54 does in the preceding embodiment can be displayed.

The inertial plate 50 of this embodiment is journalled on a boss portion 72 of a joint 70 in a manner to be freely rotatable. The rectangular projections 38 of the takeup shaft 22 are inserted into a pair of rectangular holes 74 penetrated through this joint 70, so that this joint 70 can be rotated integrally with the takeup shaft 22.

The other arrangement is substantially identical with that of the preceding embodiment and adapted to perform the similar functions so as to obtain the similar effects.

Figure 10:
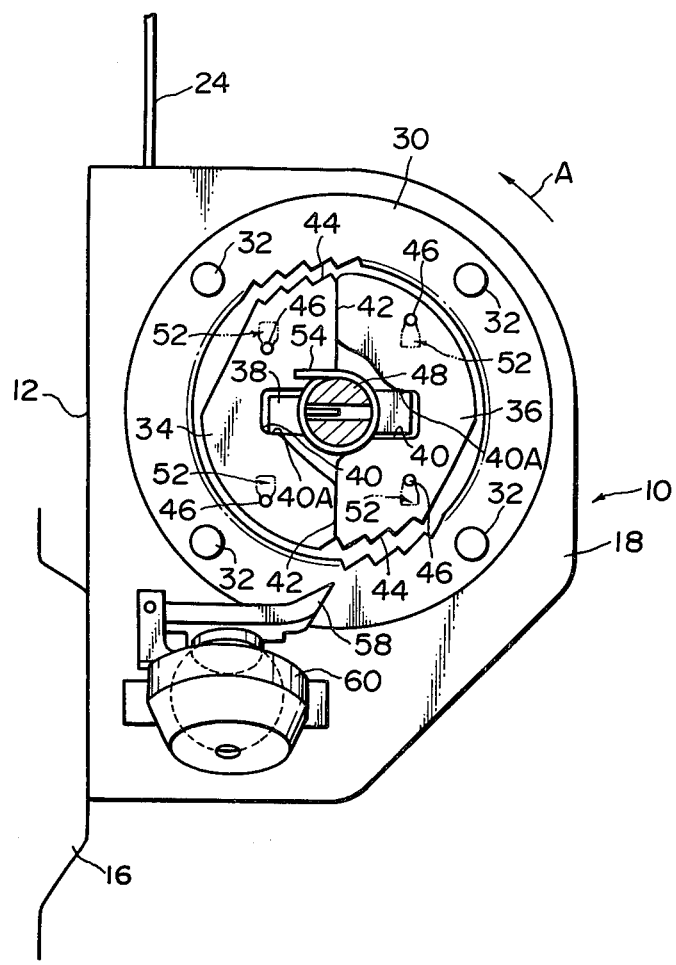
FIG. 10 is a sectional view corresponding to FIG. 3, showing a third embodiment of the present invention.
Figure 11:
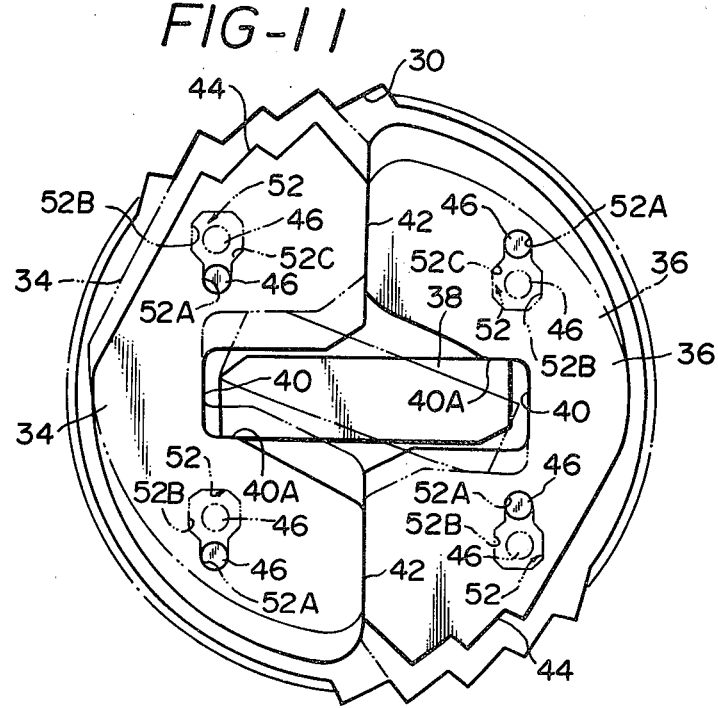
FIG. 11 is a view illustrating the locking mechanism portion of the second embodiment with a locked position shown in phantom.
Figure 12:
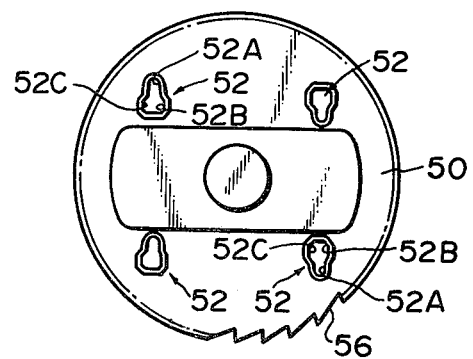
FIG. 12 is a sectional view corresponding to FIG. 6, showing the inertial plate of the second embodiment.

FIGS. 10 through 12 show the third embodiment of the present invention. As shown in FIG. 12, each of the four slots 52 formed on the surface of the inertial plate 50 at the side of the lock plates in opposed relations to the pins 46 has a narrow width portion 52A at one side and a wide width portion 52B at the other side. The narrow width portion 52A is so narrow as to closely receive the pin 46 and the wide width portion is so wide as to have a gap around the outer periphery of the pin 46.

The pins 46 are received by these slots 52 and the both members constitute guide means. As shown in FIG. 10, when the pin 46 is received by the narrow width portion 52A, the pair of lock plates 34 and 36 are separated from the internally toothed ratchet wheel 30, and, when the pin 46 is received by the wide width portion 52B, the locking clicks 44 are brought into engagement with the internally toothed ratchet wheel 30.

When the takeup shaft 22 is rotated in the unwinding direction at a predetermined acceleration or less, the inertial plate 50 is subjected to a biasing force of the spring 54 to follow the rotation of the takeup shaft 22 and rotates integrally with the takeup shaft 22. In this condition, the pin 46 is received by the narrow width portion 52A. Further, when the webbing rotation of the takeup shaft is carried out rapidly, an inertial force of the inertial plate 50 causes the torsion coil spring 54 to flex and generates a lag in rotation from the takeup shaft 22. In this condition, the pin 46 is subjected to the unwinding turning force of the takeup shaft 22 to be moved into the wide width portion 52B of the slot 52.

Description will hereunder be given of operation of this third embodiment.

The pins 46 of the lock plates 34 and 36 are closely received by the narrow width portions 52A of the slots 52 when the takeup shaft 22 is rotated during normal running condition of the vehicle, and no looseness occurs between the lock plates 34, 36 and the rectangular projections 38 of the takeup shaft 22, thus enabling to eliminate a possibility of generating noises.

In an emergency situation of the vehicle, similarly to the cases of the preceding embodiments, the inertial plate 50 has a lag in rotation from the takeup shaft 22, whereby the lock plates 34, 36 are brought into engagement with the internally toothed ratchet wheel 30 to thereby instantaneously stop the unwinding rotation of the takeup shaft 22.

In the lock state described above, the pins 46 are loosely received by the wide width portions 52B of the slots 52 as indicated by two-dot chain lines in FIG. 11. Furthermore, while being moved into the locked state, the lock plates 34 and 36 are subjected to the driving forces of the takeup shaft's rectangular projections 38 in the condition of the pins 46 being closely received by the narrow width portions 52A of the slots 52, so that the lock plates 34 and 36 can be quickly brought into engagement with the internally toothed ratchet wheel 30.

In the locked state described above, the inertial plate 50 is prevented from rotating, and, on the other hand, the pins 46 receive the driving forces of the takeup shaft's rectangular projections 38, whereby the pins 46 are subjected to forces which move the pins 46 in the width-wise directions of the slots 52. In this embodiment, each of the slots 52 has the wide width portion 52B at one end thereof, whereby, in the locked states, gaps are formed between the pins 46 and the wide width portions 52B, respectively, thereby enabling to eliminate a possibility of damaging the pins 46 or the slots 52. Moreover, these wide width portions 52B are adapted to absorb tolerances in dimensions generated in the pins 46, the lock plates 34, 36, the takeup shaft's rectangular projections 38 and the like, thereby enabling to obviate unnecessary loads which would otherwise be applied in the widthwise directions of the slots 52 between the pins 46 and the slots 52.

In this case, the pins 46 received in the locked state thereof by the wide width portion 52B have gaps between the wide width portions 52B and themselves, whereby the pins 46 can readily enter the narrow width portions 52A, so that bite-ins of the pins 46 into the slots 52 are avoided which would occur when each of the widths of the slots 52 is made equal to that of the narrow width portions 52A over the total width, thus enabling to smooth the movements of the pins. In addition, stepped portions 52C formed between the narrow width portion 52A and the wide width portion 52B are tapered such that the stepped portions 52C are made progressively narrower from the wide width portion 52B to the narrow width portion 52A, so that the pin 46 can be further easily guided into the narrow width portion 52A.

What is claimed is:

1. A webbing retractor used in a seatbelt system for protecting an occupant in an emergency situation of a vehicle for winding an occupant restraining webbing, comprising:
    (a) a frame secured to a vehicle body;
    (b) a takeup shaft pivotally supported on said frame for winding one end of said occupant restraining webbing;
    (c) a lock ring supported coaxially with said takeup shaft and adapted to generate a lag in rotation from said takeup shaft in an emergency of the vehicle;
    (d) an internally toothed ratchet wheel solidly secured to said frame;
    (e) lock plates provided for holding said takeup shaft therebetween;
    (f) guide means comprising slots and projecting pins engaging with said slots provided on said lock plates and said lock ring for guiding said lock plates in a manner to be movable in directions opposite to each other, said slots of said guide means being formed with narrow width portions for receiving said pins during normal condition of the vehicle and further with wide portions for receiving said pins in an emergency situation of the vehicle, whereby said narrow width portions closely receive said pins to eliminate gaps in said lock plates and said wide portions loosely receive said pins to prevent said pins from being damaged; and
    (g) engageable means adapted to be subjected to a turning force of said takeup shaft to drive said lock plates in directions opposite to each other when said takeup shaft and said lock ring move relative to each other, whereby said lock plates are pushed against and meshed with said internally toothed ratchet wheel, so that the webbing unwinding rotation of said takeup shaft can be stopped.

2. A webbing retractor as set forth in claim 1, wherein said engageable means has projections radially projecting from said takeup shaft and recesses formed in said lock plates, respectively, for receiving said projections.

3. A webbing retractor as set forth in claim 1, wherein said pair of lock plates are adapted to abut against each other in conditions of being separated from said internally toothed ratchet wheel.

4. A webbing retractor as set forth in claim 3, wherein said pair of lock plates are arranged and configured to slidably move in directions opposite to each other when said engageable means is operated.

5. A webbing retractor as set forth in any one of claims 1 through 4, wherein said lock ring is subjected to a braking force by an acceleration sensor in an emergency situation of the vehicle.

6. A webbing retractor as set forth in claim 2, wherein said recesses of the lock plates are formed in central portions of the lock plates and formed into substantially C-shapes, respectively.

7. A webbing retractor as set forth in claim 1, wherein said lock plates are movable in radial directions of said takeup shaft and biased by a biasing means in directions approaching each other.

8. A webbing retractor as set forth in claim 1, wherein said lock ring is an inertial plate to generate a lag in rotation from said takeup shaft due to a violent webbing unwinding rotation of said takeup shaft.

9. A webbing retractor comprising:
 (a) a frame secured to a vehicle body;
 (b) a takeup shaft pivotally supported on said frame for winding one end of an occupant restraining webbing;
 (c) a lock ring supported coaxially with said takeup shaft and adapted to generate a lag in rotation from said takeup shaft in an emergency situation of a vehicle;
 (d) an internally toothed ratchet wheel solidly secured to said frame;
 (e) a lock member supported by said takeup shaft, being movable relative to said takeup shaft from a first position to a second position, said lock member being engaged with said internally toothed ratchet wheel at said second position so as to prevent said takeup shaft from rotating in the webbing unwinding direction; and
 (f) guide means comprising pins projecting from said lock member and slots formed in said lock ring for guiding said lock member from said first position to said second position when said lock ring has a lag in rotation, said slots each including a narrow width portion for closely receiving said pins in the first position of said lock member and a wide width portion for loosely receiving said pin in the second position of said lock member.

10. A webbing retractor as set forth in claim 9, wherein said lock plates are provided in a pair for holding said takeup shaft therebetween and guided by said guide means in a manner to be movable in directions opposite to each other.

11. A webbing retractor as set forth in claim 9 or 10, wherein said lock ring is prevented from rotating by an acceleration sensor in an emergency situation of the vehicle.

* * * * *